(12) United States Patent
Kim

(10) Patent No.: US 10,788,842 B2
(45) Date of Patent: Sep. 29, 2020

(54) APPARATUS AND METHOD FOR CONTROLLING PLATOONING IN LEADING VEHICLE

(71) Applicants: Hyundai Motor Company, Seoul (KR); Kia Motors Corporation, Seoul (KR)

(72) Inventor: Sang Jun Kim, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 118 days.

(21) Appl. No.: 16/020,483

(22) Filed: Jun. 27, 2018

(65) Prior Publication Data
US 2019/0179339 A1    Jun. 13, 2019

(30) Foreign Application Priority Data
Dec. 11, 2017 (KR) .......................... 10-2017-0169197

(51) Int. Cl.
*B60W 30/09* (2012.01)
*G05D 1/02* (2020.01)
(Continued)

(52) U.S. Cl.
CPC .......... *G05D 1/0293* (2013.01); *B60W 30/09* (2013.01); *B60W 30/0956* (2013.01); *B60W 30/17* (2013.01); *G05D 1/0088* (2013.01); *G05D 1/0295* (2013.01); *G08G 1/162* (2013.01); *G08G 1/166* (2013.01); *G08G 1/167* (2013.01); *G08G 1/22* (2013.01); *B60W 2554/00* (2020.02); *B60W 2556/65* (2020.02); *B60W 2710/18* (2013.01); *G05D 2201/0213* (2013.01)

(58) Field of Classification Search
CPC ........ B60W 30/09; G05D 1/0293; G08G 1/22
See application file for complete search history.

(56) References Cited

U.S. PATENT DOCUMENTS 5,485,892 A * 1/1996 Fujita ................... B60K 28/066
                                                          180/167
2010/0256852 A1* 10/2010 Mudalige ............... G08G 1/163
                                                              701/24
(Continued)

FOREIGN PATENT DOCUMENTS

JP     2002-266672 A     9/2002
WO     2016134770 A1     9/2016

*Primary Examiner* — Anshul Sood
(74) *Attorney, Agent, or Firm* — Mintz Levin Cohn Ferris Glovsky and Popeo, P.C.; Peter F. Corless

(57) ABSTRACT

An apparatus for controlling platooning in a platooning group including a leading vehicle and one or more following vehicles can include: one or more sensors, a communication circuit, a display, and a processor. The processor can be configured to predict whether a collision with an object ahead of the leading vehicle will occur using information sensed by at least a portion of the one or more sensors; control one or more of a braking operation of the leading vehicle and a lane change operation of the leading vehicle based on the generated probability; and transmit a control signal to the following vehicle via the communication circuit for controlling one or more of a braking operation of the following vehicle and a lane change operation of the following vehicle based on a generated probability.

20 Claims, 10 Drawing Sheets

(51) Int. Cl.
    *G08G 1/00*     (2006.01)
    *G08G 1/16*     (2006.01)
    *B60W 30/095*   (2012.01)
    *B60W 30/17*    (2020.01)
    *G05D 1/00*     (2006.01)

(56) References Cited

U.S. PATENT DOCUMENTS

2017/0011633 A1* 1/2017 Boegel .................. G05D 1/0293
2017/0210382 A1* 7/2017 Nishimura ............. G08G 1/165
2017/0308097 A1* 10/2017 Switkes ................ G05D 1/0217
2019/0027045 A1* 1/2019 Laur .................... G05D 1/0276

* cited by examiner

APPARATUS AND METHOD FOR CONTROLLING PLATOONING IN LEADING VEHICLE

CROSS-REFERENCE TO RELATED APPLICATION

This application is based on and claims the benefit of priority to Korean Patent Application No. 10-2017-0169197, filed on Dec. 11, 2017 in the Korean Intellectual Property Office, the disclosure of which is incorporated herein in its entirety by reference.

TECHNICAL FIELD

The present disclosure relates generally to vehicular technologies and, more particularly, to an apparatus and method for providing a collision prevention strategy during platooning of a plurality of vehicles.

BACKGROUND

Platooning refers to an autonomous driving technology involving a plurality of vehicles located at a specified interval in a row. A leading vehicle which is foremost in a platooning line may control one or more of the following vehicles which follow the leading vehicle. The leading vehicle may maintain the interval between the vehicles in the platooning line and may exchange behavior and context information of the vehicles in the platooning line using vehicle-to-vehicle (V2V) communication.

Conventionally, when the leading vehicle detects an obstruction ahead of its driving lane, the leading vehicle may share information about the obstruction with the following vehicle(s) and control a braking and/or steering operation to prevent a collision with the obstruction. However, the conventional platooning system may fail to provide avoidance strategies capable of increasing the likelihood of avoiding a collision. Particularly, it may be difficult for a following vehicle to quickly react to a dangerous situation with a view of the following vehicle being restricted due to platooning.

SUMMARY

The present disclosure has been made to solve the above-mentioned problems occurring in the related art while advantages achieved by the related art are maintained intact.

An aspect of the present disclosure provides an apparatus and method for controlling platooning to provide various strategies for a leading vehicle and a following vehicle to react to a dangerous situation during platooning.

The technical problems to be solved by the present inventive concept are not limited to the aforementioned problems, and any other technical problems not mentioned herein will be clearly understood from the following description by those skilled in the art to which the present disclosure pertains.

According to embodiments of the present disclosure, an apparatus for controlling platooning in a platooning group including a leading vehicle and one or more following vehicles may include: one or more sensors configured to sense an object around the leading vehicle; a communication circuit configured to communicate with a following vehicle among the one or more following vehicles; a display configured to output a user interface associated with the platooning; and a processor electrically connected with the one or more sensors, the communication circuit, and the display.

The processor can be configured to: predict whether a collision with an object ahead of the leading vehicle will occur using information sensed by at least a portion of the one or more sensors; when the collision with the object is predicted to occur, generate a probability of a collision occurring when the leading vehicle brakes, a probability that the leading vehicle will change its lane, a probability of a collision occurring when the following vehicle brakes, or a probability that the following vehicle will change its lane, based on the information sensed by at least the portion of the one or more sensors; control one or more of a braking operation of the leading vehicle and a lane change operation of the leading vehicle based on at least one of the generated possibilities; and transmit a control signal to the following vehicle via the communication circuit for controlling one or more of a braking operation of the following vehicle and a lane change operation of the following vehicle based on the generated probability.

The processor may be configured to control the braking operation of the leading vehicle causing the leading vehicle to brake when it is determined that the collision will not occur when the leading vehicle brakes based on at least one of the generated possibilities.

The processor may be configured to transmit the control signal to the following vehicle via the communication circuit for controlling the braking operation of the following vehicle causing the following vehicle to brake.

The processor may be configured to output an indication of the braking operation of the leading vehicle via the display; and transmit a control signal to the following vehicle via the communication circuit for outputting an indication of the braking operation of the following vehicle causing the following vehicle to output the indication.

The processor may be configured to control the lane change operation of the leading vehicle causing the leading vehicle to change its driving lane to a target lane adjacent to the driving lane when it is determined that the collision will occur when the leading vehicle brakes and that the leading vehicle is able to change its driving lane to the target lane based on the generated probability.

The processor may be configured to, when it is determined that the collision will occur when the leading vehicle brakes and that the leading vehicle is able to change its driving lane to the target lane, transmit the control signal to the following vehicle via the communication circuit for controlling a driving operation of the following vehicle causing the following vehicle to follow the leading vehicle and the lane change operation causing the following vehicle to change the driving lane to the target lane.

The processor may be configured to output an indication of the lane change operation of the leading vehicle and a direction of the lane change operation of the leading vehicle via the display; and transmit a control signal to the following vehicle via the communication circuit for outputting an indication of the lane change operation of the following vehicle and a direction of the lane change operation of the following vehicle causing the following vehicle to output the indication.

The processor may be configured to transmit the control signal to the following vehicle via the communication circuit for controlling the braking operation of the following vehicle causing the following vehicle to brake when it is determined that the collision will not occur when the when the following vehicle brakes based on at least one of the generated possibilities.

The processor may be configured to output an indication of the lane change operation of the leading vehicle and a direction of the lane change operation of the leading vehicle via the display; and transmit a control signal to the following vehicle via the communication circuit for outputting an indication of the braking operation of the following vehicle causing the following vehicle to output the indication.

The processor may be configured to transmit the control signal to the following vehicle via the communication circuit for controlling the lane change operation of the following vehicle causing the following vehicle to change its driving lane to a lane opposite the target lane when it is determined that the collision will occur when the following vehicle brakes and that the following vehicle is able to change the driving lane to the lane opposite the target lane based on at least one of the generated possibilities.

The processor may be configured to deactivate the platooning when the leading vehicle changes its driving lane to the target lane and when the following vehicle changes its driving lane to the lane opposite the target lane; transfer a right to control the leading vehicle to a driver of the leading vehicle; and transmit the control signal to the following vehicle via the communication circuit for controlling an operation of the following vehicle causing the following vehicle to transfer a right to control the following vehicle to a driver of the following vehicle.

The processor may be configured to output an indication of the lane change operation of the leading vehicle, a direction of the lane change operation of the leading vehicle, and the transfer of the right to control the leading vehicle via the display; and transmit the control signal to the following vehicle via the communication circuit for outputting an indication of the lane change operation of the following vehicle, a direction of the lane change operation of the following vehicle, and the transfer of the right to control the following vehicle causing the following vehicle to output the indication.

The processor may be configured to deactivate the platooning when it is determined that the collision will occur when the leading vehicle brakes and that the leading vehicle is unable to change its driving lane to a lane adjacent to the driving lane based on at least one of the generated possibilities; transfer a right to control the leading vehicle to a driver of the leading vehicle; and transmit the control signal to the following vehicle via the communication circuit for controlling an operation of the following vehicle causing the following vehicle to transfer a right to control the following vehicle to a driver of the following vehicle.

The processor may be configured to output a warning of a collision involving the leading vehicle and an indication of the transfer of the right to control the leading vehicle via the display; and transmit the control signal to the following vehicle via the communication circuit for outputting a warning of a collision of the following vehicle and an indication of the transfer of the right to control the following vehicle.

The processor may be configured to deactivate the platooning when it is determined that the collision will occur when the following vehicle brakes and that the following vehicle is unable to change its driving lane to a lane adjacent to the driving lane; and transmit the control signal to the following vehicle via the communication circuit for controlling an operation of the following vehicle causing the following vehicle to transfer a right to control the following vehicle to a driver of the following vehicle.

The processor may be configured to transmit the control signal to the following vehicle via the communication circuit for outputting a warning of a collision of the following vehicle and an indication of the transfer of the right to control the following vehicle causing the following vehicle to output the indication.

Furthermore, according to embodiments of the present disclosure, a method for controlling platooning in a platooning group including a leading vehicle and one or more following vehicles may include: sensing an object around the leading vehicle using one or more sensors; predicting whether a collision with an object ahead of the leading vehicle will occur using information sensed by at least a portion of the one or more sensors; when the collision with the object is predicted to occur, generating a probability of a collision occurring when the leading vehicle brakes, a probability that the leading vehicle will change its lane, a probability of a collision occurring when the following vehicle brakes, or a probability that the following vehicle will change its lane, based on the information sensed by at least the portion of the one or more sensors; controlling one or more of a braking operation of the leading vehicle and a lane change operation of the leading vehicle based on at least one of the generated possibilities; and transmitting a control signal to the following vehicle via the communication circuit for controlling one or more of a braking operation of the following vehicle and a lane change operation of the following vehicle based on at least one of the generated possibilities.

The controlling may include control the lane change operation of the leading vehicle causing the leading vehicle to change its driving lane to a target lane adjacent to the driving lane when it is determined that the collision will occur when the leading vehicle brakes and that the leading vehicle is able to change its driving lane to the target lane based on at least one of the generated possibilities. The transmitting may include, when it is determined that the collision will occur when the following vehicle brakes and that the following vehicle is able to change its driving lane to the target lane based on at least one of the generated possibilities, transmitting to the following vehicle a control signal for controlling a driving operation of the following vehicle causing the following vehicle to follow the leading vehicle and the lane change operation causing the following vehicle to change the driving lane to the target lane.

The controlling may include controlling the lane change operation of the leading vehicle causing the leading vehicle to change its driving lane to a target lane adjacent to the driving lane when it is determined that the collision will occur when the leading vehicle brakes and that the leading vehicle is able to change its driving lane to the target lane based on at least one of the generated possibilities. The transmitting may include transmitting the control signal to the following vehicle for controlling the braking operation of the following vehicle causing the following vehicle to brake when it is determined that the collision will not occur when the following vehicle brakes based on at least one of the generated possibilities.

The controlling may include controlling the lane change operation of the leading vehicle causing the leading vehicle to change its driving lane to a target lane adjacent to the driving lane when it is determined that the collision will occur when the leading vehicle brakes and that the leading vehicle is able to change its driving lane to the target lane based on at least one of the generated possibilities. The transmitting may include transmitting the control signal to the following vehicle for controlling the lane change operation of the following vehicle causing the following vehicle to change its driving lane to a lane opposite the target lane when it is determined that the collision will occur when the following vehicle brakes and that the following vehicle is able to change the driving lane to the lane opposite to the target lane based on at least one of the generated possibilities.

BRIEF DESCRIPTION OF THE DRAWINGS

The above and other objects, features and advantages of the present disclosure will be more apparent from the following detailed description taken in conjunction with the accompanying drawings.

Figure 1:
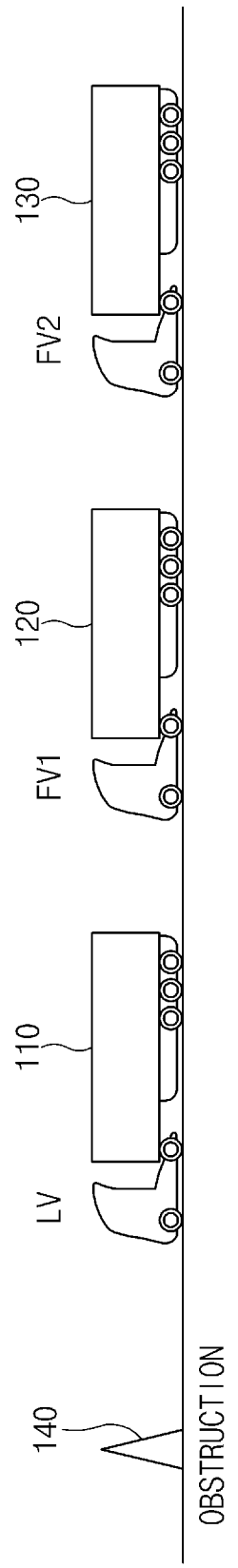
FIG. 1 is a drawing illustrating an environment where an apparatus for controlling platooning in a leading vehicle is operated, according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. In adding reference denotations to elements of each drawing, although the same elements are displayed on a different drawing, it should be noted that the same elements have the same denotations. In addition, in describing an embodiment of the present disclosure, if it is determined that a detailed description of related well-known configurations or functions blurs the gist of an embodiment of the present disclosure, it will be omitted.

In describing elements of embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

FIG. 1 is a drawing illustrating an environment where an apparatus for controlling platooning in a leading vehicle is operated, according to embodiments of the present disclosure.

As shown in FIG. 1, a leading vehicle 110, a first following vehicle 120, and a second following vehicle 130 may perform platooning. The leading vehicle 110 may detect an obstruction 140 in front of the leading vehicle 110 during the platooning. The leading vehicle 110 may avoid a collision with the obstruction 140 by braking or may avoid the collision with the obstruction 140 by changing its driving lane. The leading vehicle 110 may avoid the collision with the obstruction 140 based on a distance between the obstruction 140 and the leading vehicle 110, a speed of the leading vehicle 110, a location and speed of another vehicle located on a neighboring lane adjacent to the leading vehicle 110, and the like. In this case, since a view of the first following vehicle 120 is restricted due to the leading vehicle 110, it may be difficult for the first following vehicle 120 to detect the obstruction 140. Since a view of the second following vehicle 130 is restricted due to the leading vehicle 110 and the first following vehicle 120, it may be difficult for the second following vehicle 130 to detect the obstruction 140. In this case, the leading vehicle 110 may provide an avoidance strategy for the first following vehicle 120 and the second following vehicle 130 to the first following vehicle 120 and the second following vehicle 130.

However, when each of the first following vehicle 120 and the second following vehicle 130 brakes, when the leading vehicle 110 changes a lane of each of the first following vehicle 120 and the second following vehicle 130, or when the leading vehicle 110 provides the same avoidance strategy as the leading vehicle 110 to the first following vehicle 120 and the second following vehicle 130, since a driving situation of the leading vehicle 110 differs from a driving situation of each of the first following vehicle 120 and the second following vehicle 130, the first following vehicle 120 and the second following vehicle 130 may be exposed to a risk of an accident. Thus, the leading vehicle 110 may provide an avoidance strategy suitable for each of the leading vehicle 110, the first following vehicle 120, and the second following vehicle 130 in overall consideration of a driving situation of the leading vehicle 110 and a driving situation of each of the first and second following vehicles 120 and 130.

Figure 2:
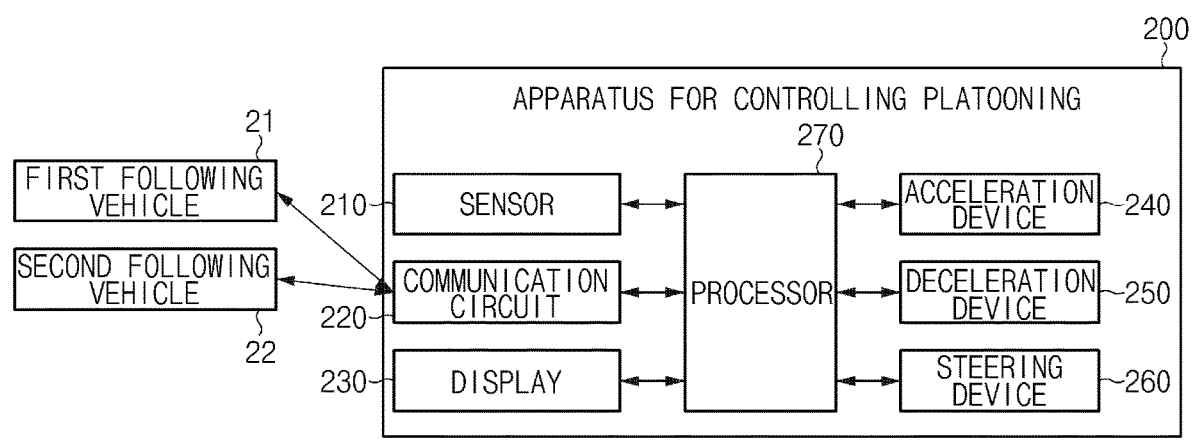
FIG. 2 is a block diagram illustrating a configuration of an apparatus for controlling platooning in a leading vehicle according to embodiments of the present disclosure.

FIG. 2 is a block diagram illustrating a configuration of an apparatus for controlling platooning in a leading vehicle according to embodiments of the present disclosure.

As shown in FIG. 2, an apparatus 200 for controlling platooning (hereinafter referred to as "apparatus 200") according to embodiments of the present disclosure may include a sensor 210 (or a plurality of sensors), a communication circuit 220, a display 230, an acceleration device 240, a deceleration device 250, a steering device 260, and a processor 270. The apparatus 200 may be a system loaded into a leading vehicle included in a platooning group.

The sensor 210 may be configured to sense an object around the leading vehicle. For example, the sensor 210 may sense an obstruction or an external vehicle located ahead of, beside, and/or behind the leading vehicle. The sensor 210 may sense a speed, acceleration, a steering angle, and the like of the leading vehicle.

The communication circuit 220 may be configured to communicate with the external vehicle. The communication circuit 220 may communicate with a following vehicle, for example, a first following vehicle 21 and a second following vehicle 22, included in the platooning group including the leading vehicle.

The display 230 may be configured to output a user interface associated with platooning. The display 230 may output an indication for providing a notification of, for example, braking, a lane change, deactivation (i.e., release) of platooning, a dangerous situation (e.g., a collision), and the like.

The acceleration device 240 may be an engine capable of enhancing a speed of the leading vehicle. The deceleration device 250 may be a brake device capable of reducing a speed of the leading vehicle. The steering device 260 may be a steering capable of adjusting a steering angle of the leading vehicle.

The processor 270 may be electrically connected with the sensor 210, the communication circuit 220, the display 230, the acceleration device 240, the deceleration device 250, and the steering device 260. The processor 270 may control the sensor 210, the communication circuit 220, the display 230, the acceleration device 240, the deceleration device 250, and the steering device 260 and may perform a variety of data processing and various arithmetic operations.

According to embodiments of the present disclosure, the processor 270 may predict a collision with an object ahead of the leading vehicle using information sensed by the sensor 210. The processor 270 may predict whether the collision with the object will occur based on a size of the object, a location of the object, a speed of the leading vehicle, and the like.

When the collision with the object is predicted, the processor 270 may generate at least one of a probability of a collision when the leading vehicle brakes, a probability that the leading vehicle will change its lane, a probability of a collision when a following vehicle brakes, and/or a probability that the following vehicle will change its lane. The processor 270 may determine various possibilities associated with controlling the leading vehicle and the following vehicle to consider a method for coping with various driving situations of the leading vehicle and the following vehicle. The processor 270 may determine a probability of a collision when the leading vehicle brakes, based on a speed of the leading vehicle, a braking distance according to the speed, and a distance between the leading vehicle and an obstruction. The processor 270 may determine a probability that the leading vehicle will change its lane, based on a location, a speed, and the like of each of external vehicles which is traveling in a lane adjacent to a driving lane of the leading vehicle.

The processor 270 may also receive information about a following vehicle from the following vehicle using the communication circuit 220. The processor 270 may generate at least one of a probability of a collision when the following vehicle brakes, based on a speed of the following vehicle, a braking distance according to the speed, and a distance between the following vehicle and an obstruction. The processor 270 may determine a probability that the following vehicle changes its lane, based on a location, a speed, and the like of each of external vehicles which is traveling in a lane adjacent to a driving lane of the following vehicle.

According to embodiments of the present disclosure, the processor 270 may control one or more of a braking operation of the leading vehicle or a lane change operation of the leading vehicle based on the generated probability or probabilities and may transmit a control signal for controlling one or more of a braking operation of a following vehicle or a lane change operation of the following vehicle to the following vehicle using the communication circuit 220.

Since the following vehicle is close to a forward vehicle during platooning and since a view of the following vehicle is restricted due to the forward vehicle, it may be difficult to optimally respond to a situation in front of the following vehicle. Thus, when a collision of the leading vehicle is predicted to occur, the processor 270 may establish an avoidance strategy for the following vehicle using information about the following vehicle as well as an avoidance strategy of the leading vehicle and may provide the avoidance strategy to the following strategy. The processor 270 may control the acceleration device 240, the acceleration device 250, and/or the steering device 260 such that the leading vehicle brakes or changes its driving lane. The processor 270 may transmit a command to control the following vehicle to brake or change a driving lane of the following vehicle to the following vehicle. A description will be given in detail below of a detailed scenario of controlling the leading vehicle and the following vehicle depending on a situation.

According to embodiments of the present disclosure, when it is determined that the leading vehicle will not collide with another object upon braking of the leading vehicle, the processor 270 may control the braking operation of the leading vehicle causing the leading vehicle to brake. When a braking distance of the leading vehicle is shorter than a distance between the leading vehicle and an obstruction, the processor 270 may control the braking operation of the leading vehicle causing the leading vehicle to brake. In this case, the processor 270 may transmit a control signal for controlling the following vehicle to brake to the following vehicle using the communication circuit 220. When the following vehicle brakes together with the leading vehicle, since there is a very low probability that the following vehicle will collide with the leading vehicle, the processor 270 may transmit a command to control the following vehicle to brake to the following vehicle.

The processor 270 may output an indication of the braking operation of the leading vehicle on the display 230 and may transmit a control signal to the following vehicle using the communication circuit 220 for outputting an indication of the braking operation of the following vehicle causing the following vehicle to brake. The processor 270 may perform control of outputting an indication indicating emergency braking to notify a user of the emergency braking.

According to embodiments of the present disclosure, when it is determined that the collision will occur upon braking of the leading vehicle and that the leading vehicle is able to change its driving lane to a target lane adjacent to the driving lane, the processor 270 may control the lane change operation of the leading vehicle causing the leading vehicle to change its driving lane to the target lane. When it is determined that the leading vehicle will collide with an obstruction ahead of the leading vehicle although the leading vehicle brakes, the processor 270 may determine whether the leading vehicle is able to change its lane to a lane adjacent to the driving lane based on information about external vehicles on the lane adjacent to the driving lane. When the leading vehicle is able to change the driving lane, the processor 270 may control the acceleration device 240, the deceleration device 250, and/or the steering device 260 to change the driving lane of the leading vehicle. Hereinafter, a description will be given of control of the following vehicle when the leading vehicle changes the driving lane to the target lane.

When it is determined that the following vehicle does not collide with the outside upon braking of the following vehicle, the processor 270 may transmit a control signal to the following vehicle using the communication circuit 220 for controlling the braking operation of the following vehicle causing the following vehicle to brake. Since the following vehicle further ensures a distance from an obstruction by a length of a leading vehicle although the leading vehicle changes its driving lane, the processor 270 may first determine a probability of a collision of the following vehicle. When it is determined that the following vehicle will not collide with an obstruction in front of the following vehicle upon braking of the following, the processor 270 may transmit a command to control the following vehicle to brake to the following vehicle.

The processor 270 may output an indication of a lane change of the leading vehicle and a direction of the lane change of the leading vehicle on the display 230 and may transmit a control signal for outputting an indication indicating braking of the following vehicle to the following vehicle using the communication circuit 220. The processor 270 may perform control of outputting an indication indicating an emergency lane change and emergency braking to notify a user of the emergency lane change and the emergency braking.

When it is determined that the following vehicle collides with the outside upon braking of the following vehicle and that the following vehicle is able to change its driving lane to a target lane, the processor 270 may transmit a control signal for controlling a driving operation of the following vehicle causing the following vehicle to follow the leading vehicle and change the driving lane to the target lane to the following vehicle using the communication circuit 220. The processor 270 may determine whether the following vehicle is able to first change the driving lane to the same lane as the leading vehicle along the leading vehicle to maintain platooning although the following vehicle change the driving lane. The processor 270 may obtain information about a location, a speed, and the like of a vehicle around the following vehicle from the following vehicle and may determine whether the following vehicle is able to change the driving lane to the same lane as the leading lane based on the obtained information. When the following vehicle is able to change the driving lane to the same lane as the leading vehicle, the processor 270 may transmit a command to control the following vehicle to follow the leading vehicle to the following vehicle.

The processor 270 may output an indication indicating a lane change of the leading vehicle and a direction of the lane change of the leading vehicle on the display 230 and may transmit a control signal for outputting an indication indicating a lane change of the following vehicle and a direction of the lane change of the following vehicle to the following vehicle using the communication circuit 220. The processor 270 may perform control of outputting an indication of an emergency lane change to notify a user of the emergency lane change.

When it is determined that the following vehicle will collide with another object upon braking of the following vehicle and that the following vehicle is able to change its driving lane to a lane opposite to a target lane, the processor 270 may transmit a control signal for controlling the following vehicle to change the driving lane to the lane opposite to the target lane. When a collision is predicted to occur when the following vehicle brakes or changes the driving lane to the same lane as the leading vehicle, the processor 270 may determine whether the following vehicle is able to change the driving lane to a lane different from the leading vehicle to prevent the collision of the following vehicle. The processor 270 may obtain information about a location, a speed, and the like of a vehicle around the following vehicle from the following vehicle and may determine whether the following vehicle is able to change the driving lane to a lane different from the leading vehicle based on the obtained information. When the following vehicle is able to change the driving lane to the lane different from the leading vehicle, the processor 270 may transmit a command to control the following vehicle to change the driving lane to the lane opposite to the target lane to the following vehicle.

When the leading vehicle changes its driving lane to a target lane and when the following vehicle changes its driving lane to a lane opposite to the target lane, the processor 270 may release platooning and may hand the right to control the leading vehicle over to a driver of the leading vehicle, thus transmitting a control signal for controlling the following vehicle to hand the right to control the following vehicle over to the driver of the following vehicle to the following vehicle using the communication circuit 220. When the leading vehicle and the following vehicle are located in different lanes, since platooning is impossible in such a case, the processor 270 may transfer the rights to control the leading vehicle and the following vehicle to drivers of the leading vehicle and the following vehicle, respectively.

The processor 270 may control the display so as to output an indication indicating a lane change of the leading vehicle, a direction of the lane change of the leading vehicle, and a handover of the right to control the leading vehicle on the display 230 and may transmit a control for outputting an indication indicating a lane change of the following vehicle, a direction of the lane change of the following vehicle, and a handover of the right to control the following vehicle to the following vehicle using the communication circuit 220. The processor 270 may perform control of the display so as to output an indication an emergency lane change and a handover of a control right to notify the user of the emergency lane change and the transfer of the control right.

When it is determined that the leading vehicle will collide with the outside upon braking of the leading vehicle and that the leading vehicle is unable to change its driving lane to a lane adjacent to the driving lane, the processor 270 may deactivate platooning and may transfer the right to control the leading vehicle to a driver of the leading vehicle, thus transmitting a control signal for controlling the following vehicle to transfer the right to control the following vehicle to a driver of the following vehicle to the following vehicle using the communication circuit 220. When it is impossible to establish a strategy capable of avoiding a collision of the leading vehicle, the processor 270 may transfer the rights to control the leading vehicle and the following vehicle over to the drivers of the leading vehicle and the following vehicle, respectively, such that the driver of each of the leading vehicle and the following vehicle may respond to the potential collision.

The processor 270 may control the display so as to output a warning of a collision of the leading vehicle and an indication of a transfer of the right to control the leading vehicle on the display 230 and may transmit a control signal for outputting a warning a collision of the following vehicle and an indication of a handover of the right to control the following vehicle to the following vehicle using the communication circuit 220. The processor 270 may perform control of outputting an indication indicating a risk of a collision and a handover of a control right to notify a user of the risk of the collision and the transfer of the control right.

When it is determined that the following vehicle will collide with the outside upon braking of the following vehicle and that the following vehicle is unable to its driving lane to a lane adjacent to the driving lane, the processor 270 may deactivate platooning and may transmit a control signal for controlling the following vehicle to hand the right to control the following vehicle to a driver of the following vehicle to the following vehicle using the communication circuit 220. When it is impossible to establish a strategy capable of avoiding a collision of the following vehicle, the processor 270 may transfer the right to control the following vehicle to the driver of the following vehicle such that the driver of the following vehicle may respond to the potential collision.

The processor 270 may warn the following vehicle of a collision of the following vehicle using the communication circuit 220 and may transmit a control signal for outputting an indication indicating a transfer of the right to control the following vehicle. The processor 270 may perform control of outputting an indication indicating a risk of a collision and a transfer of a control right to notify the user of the risk of the collision and the transfer of the control right.

Figure 3:
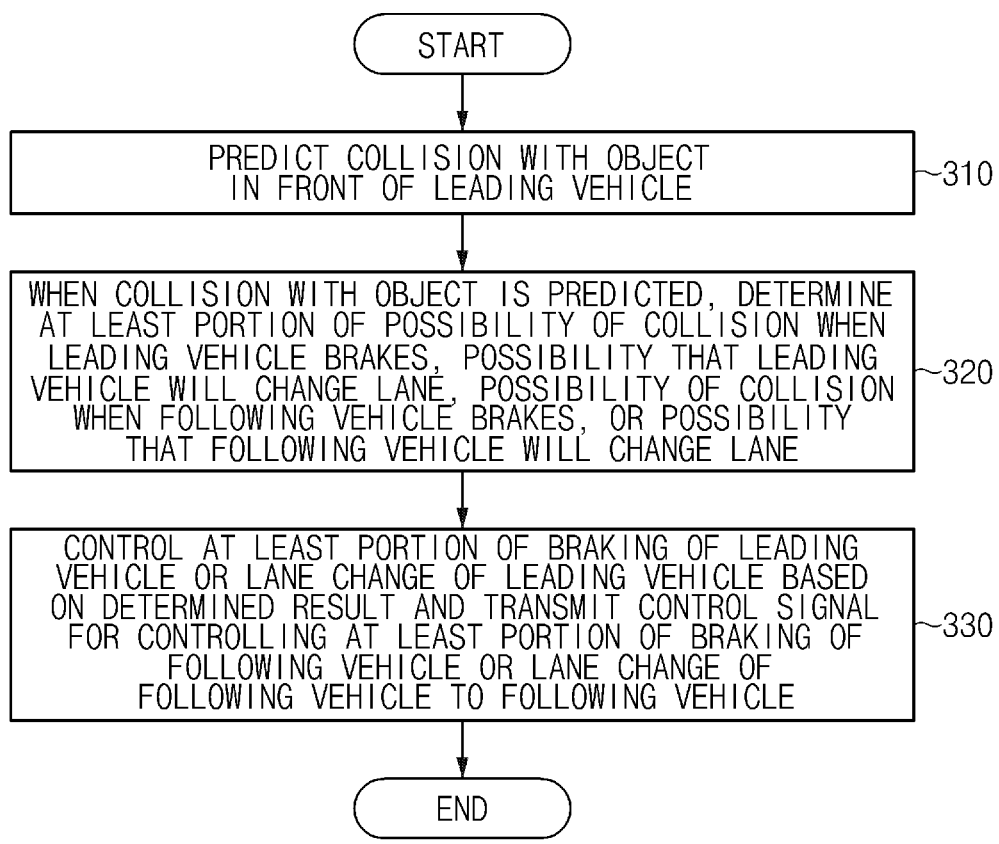
FIG. 3 is a flowchart illustrating a method for controlling platooning in a leading vehicle according to embodiments of the present disclosure.

FIG. 3 is a flowchart illustrating a method for controlling platooning in a leading vehicle according to embodiments of the present disclosure.

Hereinafter, it may be assumed that the apparatus 200 of FIG. 2 performs a process of FIG. 3. Further, in a description of FIG. 3, an operation described as being performed by an apparatus may be understood as being controlled by a processor 270 of the apparatus 200.

As shown in FIG. 3, in operation 310, the apparatus may predict whether a collision with an object in front of a leading vehicle will occur. The apparatus may predict whether the collision between the leading vehicle and the object ahead of the leading vehicle will occur based on a braking distance of the leading vehicle and a distance between the leading vehicle and the object.

in operation 320, when the collision with the object is predicted, the apparatus may determine at one of a probability of a collision when the leading vehicle brakes, a probability that the leading vehicle will change its lane, a probability of a collision when a following vehicle brakes, or a probability that the following vehicle will change its lane. The apparatus may determine various routes where the leading vehicle and the following vehicle are able to travel to provide various strategies for collision avoidance to the leading vehicle and the following vehicle.

In operation 330, the apparatus may control at one of a braking operation of the leading vehicle and a lane change operation of the leading vehicle based on the generated probability or probabilities and may transmit a control signal for controlling at least one of a braking operation of the following vehicle and a lane change operation of the following vehicle to the following vehicle. The apparatus may provide a collision avoidance strategy suitable for a situation of each of the leading vehicle and the following vehicle to each of the leading vehicle and the following vehicle.

Figure 4:
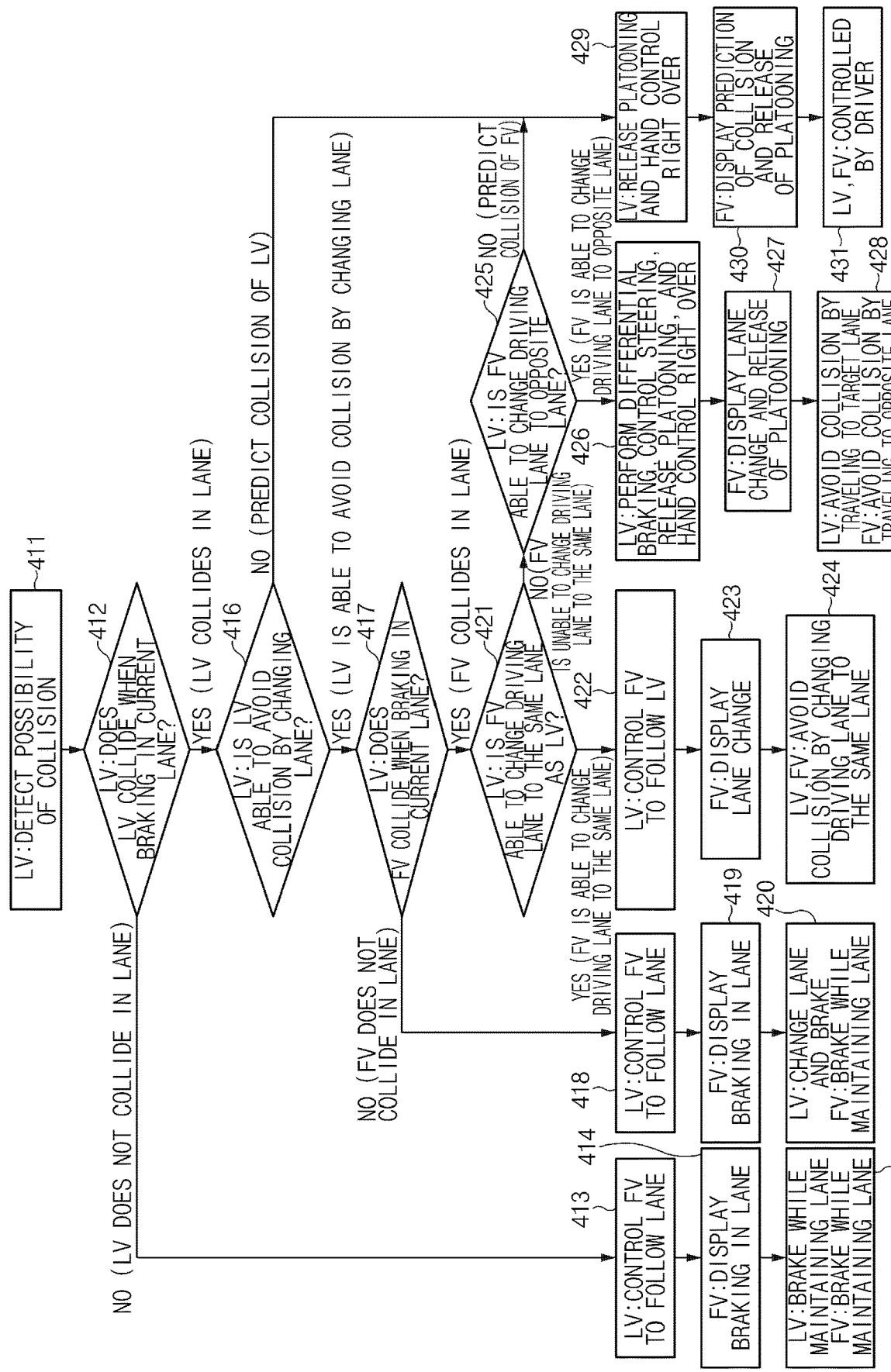
FIG. 4 is a flowchart illustrating another method for controlling platooning in a leading vehicle according to embodiments of the present disclosure.

FIG. 4 is a flowchart illustrating another method for controlling platooning in a leading vehicle according to embodiments of the present disclosure.

The leading vehicle may first determine whether it is able to avoid a collision when braking sharply in a current lane upon avoidance of the collision. When the leading vehicle is unable to avoid the collision, it may select a strategy capable of minimizing its damage based on a location of an obstruction, a location and speed of another vehicle on a left/right lane, or the like. The leading vehicle may select a strategy to be applied to the leading vehicle and may determine a strategy capable of preventing a collision of a following vehicle. The leading vehicle may first determine whether the following vehicle is able to avoid a collision when braking sharply in a current lane. When the following vehicle is unable to brake sharply, the leading vehicle may determine whether the following vehicle is able to follow the leading vehicle based on a location of an obstruction, a location and speed of another vehicle on a left/right lane, or the like. When the following vehicle is unable to follow the leading vehicle, the leading vehicle may determine whether the following vehicle is able to change its driving lane to a lane different from the leading vehicle based on a location of the obstruction, a location and speed of another vehicle on the left/right lane, or the like. When the leading vehicle is unable to establish a strategy capable of minimizing damage, it may hand the rights to control the leading vehicle and the following vehicle over to drivers of the leading vehicle and the following vehicle, respectively, such that each driver makes a decision capable of minimizing damage. A description will be given in detail below of a detailed process with reference to FIG. 4.

As shown in FIG. 4, in operation 411, a leading vehicle LV may detect a probability of a collision with an obstruction in front of the leading vehicle LV.

In operation 412, the leading vehicle LV may predict whether the leading vehicle LV will collide with the obstruction when braking in a current lane.

When it is determined that the leading vehicle LV does not collide with the obstruction in the lane, in operation 413, the leading vehicle LV may transmit a command for a following vehicle FV to follow the lane to the following vehicle FV. In operation 414, the following vehicle FV may output an indication indicating braking in the lane. In operation 415, each of the leading vehicle LV and the following vehicle FV may brake while maintaining the lane.

When it is determined that the leading vehicle LV will collide with the obstruction in the lane, in operation 416, the leading vehicle LV may determine whether it is able to avoid a collision by changing its lane.

When it is determined that the leading vehicle LV is able to avoid the collision, in operation 417, the leading vehicle LV may determine whether the following vehicle FV collides with the obstruction when braking in the current lane.

When it is determined that the following vehicle FV does not collide with the obstruction in the lane, in operation 418, the leading vehicle LV may transmit a command for the following vehicle FV to follow the lane to the following vehicle FV. In operation 419, the following vehicle FV may output an indication indicating braking in the lane. In operation 420, the leading vehicle LV may change the lane and may brake, and the following vehicle FV may brake while maintaining its lane.

When it is determined that the following vehicle FV will collide with the obstruction in the lane, in operation 421, the leading vehicle LV may determine whether the following vehicle FV is able to avoid a collision by changing its driving lane to the same lane as the leading vehicle LV.

When it is determined that the following vehicle FV is able to change the driving lane to the same lane as the leading vehicle LV, in operation 422, the leading vehicle LV may transmit a command for the following vehicle FV to follow the leading vehicle LV to the following vehicle FV. In operation 423, the following vehicle FV may output an indication indicating a lane change. In operation 424, each of the leading vehicle LV and the following vehicle FV may avoid a collision by changing the driving lane to the same lane.

When it is determined that the following vehicle FV is unable to change the driving lane to the same lane as the leading vehicle LV, in operation 425, the leading vehicle LV may determine whether the following vehicle FV is able to avoid a collision by changing the driving lane to a lane opposite to the leading vehicle LV.

When it is determined that the following vehicle FV is able to change its driving lane to the lane opposite to the leading vehicle LV, in operation 426, the leading vehicle LV may transmit a command for the following vehicle FV to perform differential braking and control steering to the following vehicle FV and may deactivate platooning, thus handing the rights to control the leading vehicle and the following vehicle over to drivers of the leading vehicle LV and the following vehicle FV, respectively. In operation 427, the following vehicle FV may output an indication indicating a lane change and the deactivation of the platooning. In operation 428, the leading vehicle LV may avoid a collision by traveling to a target lane, and the following vehicle FV may avoid a collision by traveling to a lane opposite to the leading vehicle LV.

When the collision of the leading vehicle LV is predicted to occur or when the collision of the following vehicle FV is predicted to occur, in operation 429, the leading vehicle LV may deactivate platooning and may transfer the rights to control the leading vehicle and the following vehicle to the drivers of the leading vehicle LV and the following vehicle FV, respectively. In operation 430, the following vehicle FV may output an indication indicating the prediction of the collision and the release of the platooning. In operation 431, each of the leading vehicle LV and the following vehicle FV may be controlled by its driver.

Figure 5:
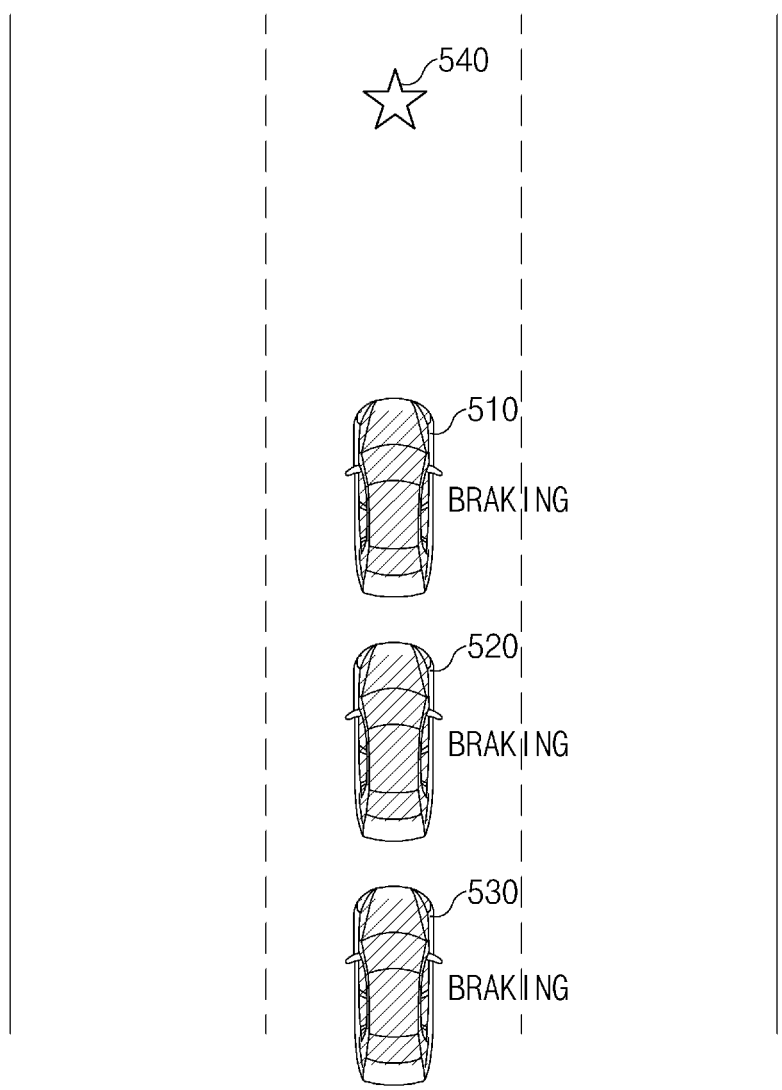
FIG. 5 is a drawing illustrating an exemplary behavior of a platooning group according to embodiments of the present disclosure.

FIG. 5 is a drawing illustrating an exemplary behavior of a platooning group according to embodiments of the present disclosure.

As shown in FIG. 5, a leading vehicle 510, a first following vehicle 520, and a second following vehicle 530 may perform platooning. The leading vehicle 510 may detect an obstruction 540 in front of the leading vehicle 510 during the platooning. The leading vehicle 510 may determine whether it is able to brake in its driving lane without colliding with the obstruction 540. When the leading vehicle 510 is able to brake in the driving lane, it may brake. When the leading vehicle 510 is able to avoid a collision by braking, since the first following vehicle 520 and the second following vehicle 530 are also able to avoid a collision by braking, the leading vehicle 510 may transmit a command to the first following vehicle 520 and the second following vehicle 530 such that each of the first following vehicle 520 and the second following vehicle 530 brakes. Each of the first following vehicle 520 and the second following vehicle 530 may brake according to the command. Thus, the leading vehicle 510, the first following vehicle 520, and the second following vehicle 530 may avoid the collision with the obstruction 540.

Figure 6:
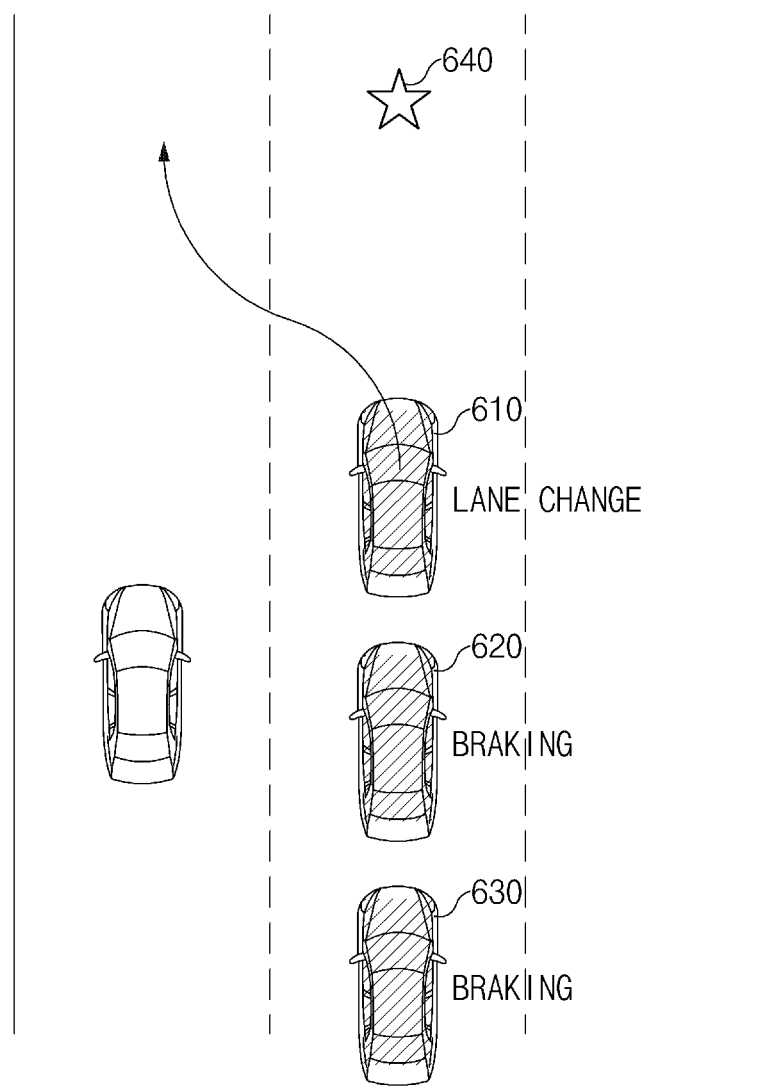
FIG. 6 is a drawing illustrating another exemplary behavior of a platooning group according to embodiments of the present disclosure.

FIG. 6 is a drawing illustrating another exemplary behavior of a platooning group according to embodiments of the present disclosure.

As shown in FIG. 6, a leading vehicle 610, a first following vehicle 620, and a second following vehicle 630 may perform platooning. The leading vehicle 610 may detect an obstruction 640 located in front of the leading vehicle 610 during the platooning. When it is determined that the leading vehicle 610 is unable to brake in its driving lane without colliding with the obstruction 640, the leading vehicle 610 may determine whether it is able to change the driving lane to another lane. When the leading vehicle 610 is able to change the driving lane to the other lane, it may change the driving lane to the other lane. Although the leading vehicle 610 is unable to brake in the driving lane without colliding with the obstruction 640, each of the first following vehicle 620 and the second following vehicle 630 may brake in the driving lane without colliding with the obstruction 640. When it is determined that each of the first following vehicle 620 and the second following vehicle 630 is able to brake in the driving lane without colliding with the obstruction 640, the leading vehicle 610 may transmit a command to the first following vehicle 620 and the second following vehicle 630 such that each of the first following vehicle 620 and the second following vehicle 630 brakes. Each of the first following vehicle 620 and the second following vehicle 630 may brake according to the command. Thus, the leading vehicle 610, the first following vehicle 620, and the second following vehicle 630 may avoid the collision with the obstruction 640.

Figure 7:
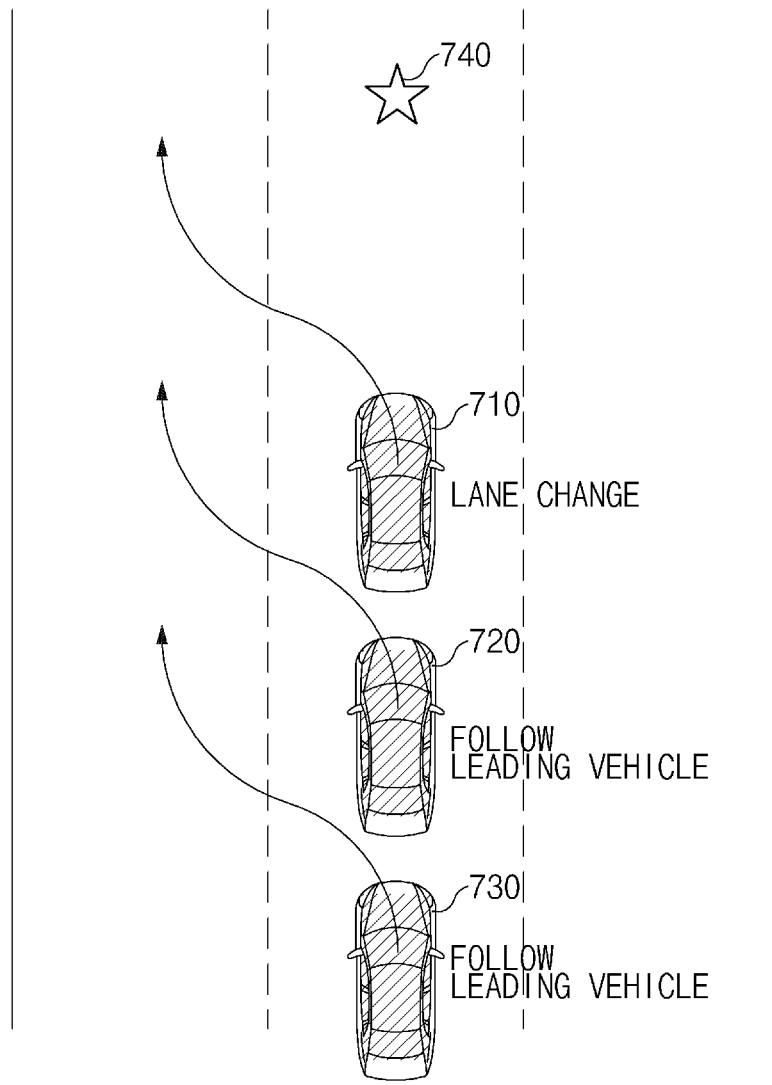
FIG. 7 is a drawing illustrating yet another exemplary behavior of a platooning group according to embodiments of the present disclosure.

FIG. 7 is a drawing illustrating yet another exemplary behavior of a platooning group according to embodiments of the present disclosure.

As shown in FIG. 7, a leading vehicle 710, a first following vehicle 720, and a second following vehicle 730 may perform platooning. The leading vehicle 710 may detect an obstruction 740 located in front of the leading vehicle 710 during the platooning. When it is determined that the leading vehicle 710 is unable to brake in its driving lane without colliding with the obstruction 740, the leading vehicle 710 may determine whether it is able to change the driving lane to another lane. When the leading vehicle 710 is able to change the driving lane to the other lane, it may change the driving lane to the other lane. The leading vehicle 710 may determine whether each of the first following vehicle 720 and the second following vehicle 730 is able to brake in the driving lane without colliding with the obstruction 740.

When it is determined that each of the first following vehicle 720 and the second following vehicle 730 is unable to brake in the driving lane without colliding with the obstruction 740, the leading vehicle 710 determine whether each of the first following vehicle 720 and the second following vehicle 730 is able to change the driving lane to the same lane as the leading vehicle 710. When it is determined that each of the first following vehicle 720 and the second following vehicle 730 is able to change the driving lane to the same lane as the leading vehicle 710, the leading vehicle 710 may transmit a command to the first following vehicle 720 and the second following vehicle 730 such that each of the first following vehicle 720 and the second following vehicle 730 follows the leading vehicle 710. Each of the first following vehicle 720 and the second following vehicle 730 may follow the leading vehicle 710 depending on the command. Thus, the leading vehicle 710, the first following vehicle 720, and the second following vehicle 730 may avoid the collision with the obstruction 740.

Figure 8:
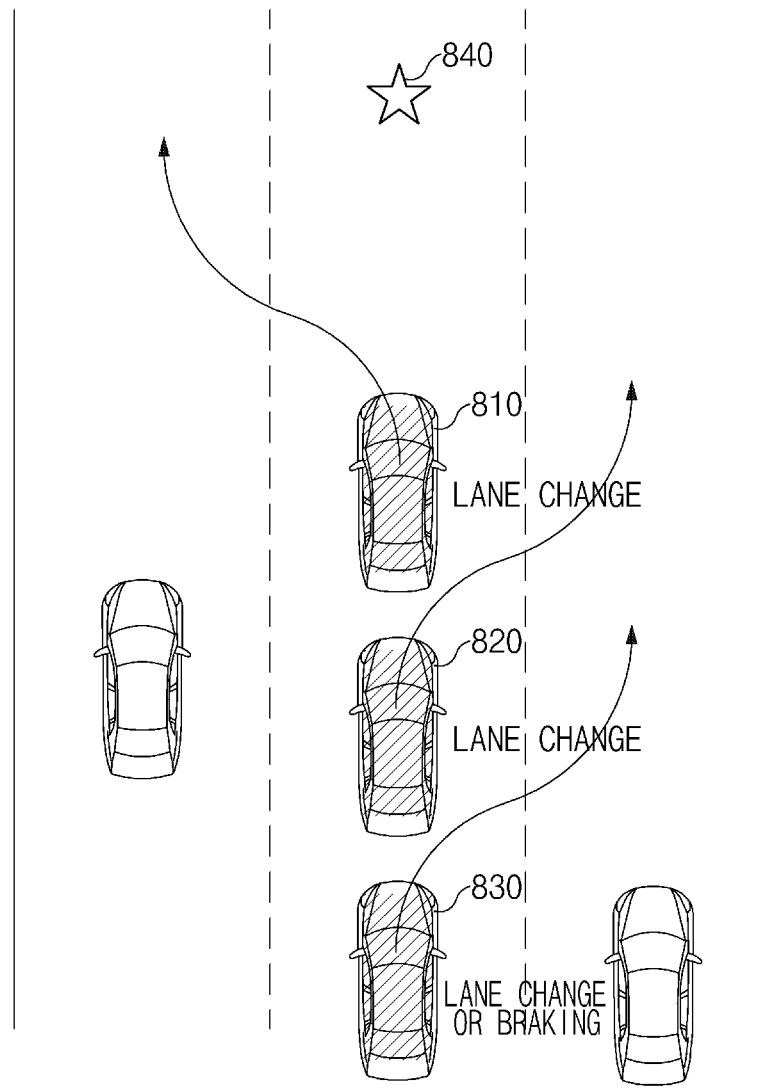
FIG. 8 is a drawing illustrating yet another exemplary behavior of a platooning group according to embodiments of the present disclosure.

FIG. 8 is a drawing illustrating yet another exemplary behavior of a platooning group according to embodiments of the present disclosure.

As shown in FIG. 8, a leading vehicle 810, a first following vehicle 820, and a second following vehicle 830 may perform platooning. The leading vehicle 810 may detect an obstruction 840 located in front of the leading vehicle 810 during the platooning. When it is determined that the leading vehicle 810 is unable to brake in its driving lane without colliding with the obstruction 840, the leading vehicle 810 may determine whether it is able to change the driving lane to another lane. When the leading vehicle 810 is able to change the driving lane to the other lane, it may change the driving lane to the other lane. The leading vehicle 810 may determine whether each of the first following vehicle 820 and the second following vehicle 830 is able to brake in the driving lane without colliding with the obstruction 840. When it is determined that each of the first following vehicle 820 and the second following vehicle 830 is unable to brake in the driving lane without colliding with the obstruction 840, the leading vehicle 810 may determine whether each of the first following vehicle 820 and the second following vehicle 830 is able to change the driving lane to the same lane as the leading vehicle 810.

When it is determined that each of the first following vehicle 820 and the second following vehicle 830 is unable to change the driving lane to the same lane as the leading vehicle 810 due to a surrounding vehicle, the leading vehicle 810 may determine whether each of the first following vehicle 820 and the second following vehicle 830 is able to change the driving lane to a lane different from the leading vehicle 810. When it is determined that each of the first following vehicle 820 and the second following vehicle 830 is able to change the driving lane to the lane different from the leading vehicle 810, the leading vehicle 810 may transmit a command to the first following vehicle 820 and the second following vehicle 830 such that each of the first following vehicle 820 and the second following vehicle 830 changes the driving lane to the other lane. Each of the first following vehicle 820 and the second following vehicle 830 may change the driving lane to the other lane depending on the command. For another example, the second following vehicle 830 may avoid a collision with the obstruction 840 by braking without changing the driving lane. In this case, the leading vehicle 810 may transmit a command to the first following vehicle 820 and the second following vehicle 830 such that the first following vehicle 820 changes the driving lane to the other lane and such that the second following vehicle 830 brakes. The first following vehicle 820 may change the driving lane to the other lane depending on the command, and the second following vehicle 830 may brake depending on the command. Thus, the leading vehicle 810, the first following vehicle 820, and the second following vehicle 830 may avoid the collision with the obstruction 840.

Figure 9:
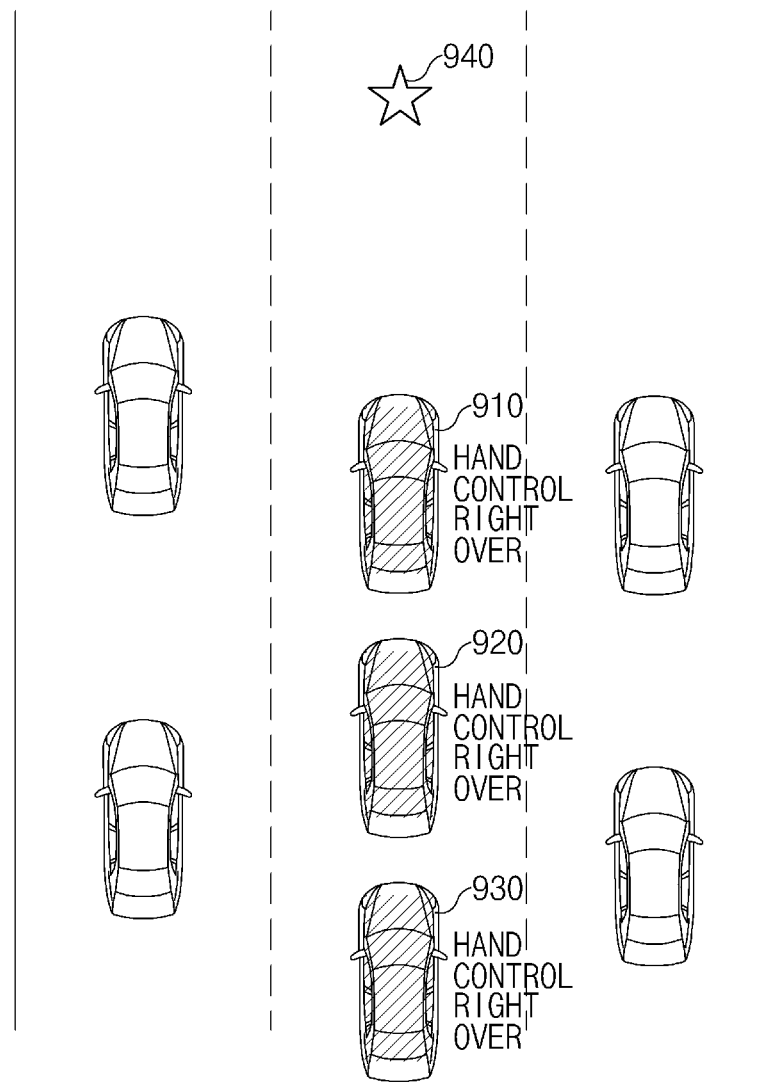
FIG. 9 is a drawing illustrating yet another exemplary behavior of a platooning group according to embodiments of the present disclosure.

FIG. 9 is a drawing illustrating yet another exemplary behavior of a platooning group according to embodiments of the present disclosure.

As shown in FIG. 9, a leading vehicle 910, a first following vehicle 920, and a second following vehicle 930 may perform platooning. The leading vehicle 910 may detect an obstruction 940 located in front of the leading vehicle 910 during the platooning. When it is determined that the leading vehicle 910 is unable to brake in its driving lane without colliding with the obstruction 940, the leading vehicle 910 may determine whether it is able to change the driving lane to another lane. When the leading vehicle 910 is unable to change the driving lane to the other lane due to a surrounding vehicle, it may release the platooning and may hand the rights to control the leading vehicle 910, the first following vehicle 920, and the third following vehicle 930 over to drivers of the leading vehicle 910, the first following vehicle 920, and the second following vehicle 930, respectively.

As another example, although the leading vehicle 910 is able to avoid a collision by traveling to another lane, it may be difficult to the first following vehicle 920 and the second following vehicle 930 to avoid a collision by braking or a lane change. In this case, the leading vehicle 910 may release the platooning and may hand the right to control the first following vehicle 920 and the second following vehicle 930 over to the drivers of the first following vehicle 920 and the second following vehicle 930, respectively. Thus, each of the drivers of the leading vehicle 910, the first following vehicle 920, and the second following vehicle 930 may correspond to avoid the collision with the obstruction 940.

Figure 10:
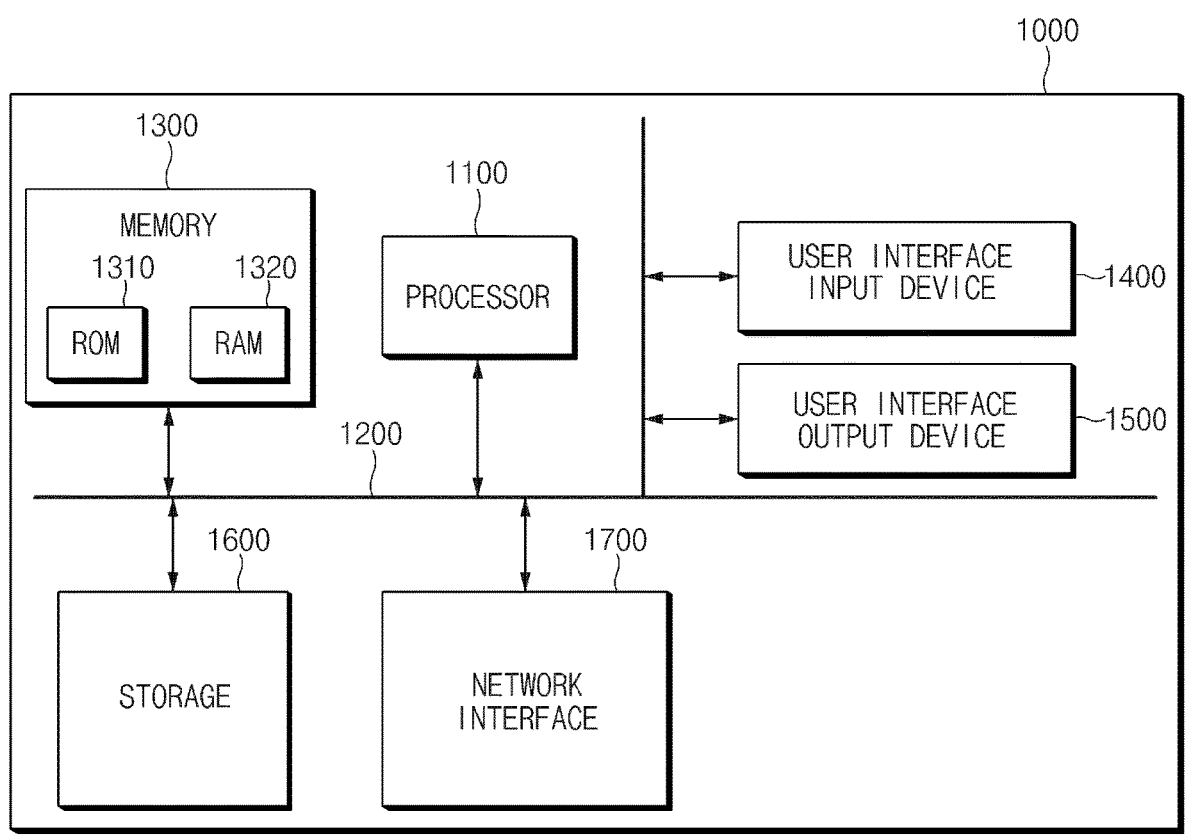
FIG. 10 is a block diagram illustrating a configuration of a computing system according to embodiments of the present disclosure.

FIG. 10 is a block diagram illustrating a configuration of a computing system according to embodiments of the present disclosure.

The above-mentioned methods according to embodiments of the present disclosure may be implemented through the computing system shown in FIG. 10. A computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for executing processing of instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or combinations thereof, executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The apparatus for controlling platooning in the vehicle according to embodiments of the present disclosure may enable vehicles to safely cope with a dangerous situation (e.g., a collision) capable of occurring during platooning by controlling a leading vehicle and a following vehicle to in light of their respective situations based on a probability that a collision involving each of the leading vehicle and the following vehicle will occur, a probability that each of the leading vehicle and the following vehicle will change its lane, and the like. In addition, various effects indirectly or directly ascertained through the present disclosure may be provided.

While the present disclosure has been described with reference to certain embodiments, it will be apparent to those skilled in the art that various changes and modifications may be made without departing from the spirit and scope of the present disclosure.

Therefore, the disclosed embodiments of the present disclosure are not limiting, but illustrative, and the spirit and scope of the present disclosure is not limited thereto. The spirit and scope and the present disclosure should be interpreted by the following claims, it should be interpreted that all technical ideas which are equivalent to the present disclosure are included in the spirit and scope of the present disclosure.

What is claimed is:

1. An apparatus for controlling platooning in a platooning group including a leading vehicle and one or more following vehicles, the apparatus comprising:
   one or more sensors configured to sense an object around the leading vehicle;
   a communication circuit configured to communicate with a following vehicle among the one or more following vehicles;
   a display configured to output a user interface associated with the platooning; and
   a processor electrically connected with the one or more sensors, the communication circuit, and the display, wherein the processor is configured to:
   predict whether a collision with the object around the leading vehicle will occur using information sensed by at least a portion of the one or more sensors;
   when the collision with the object is predicted to occur, generate a probability of a collision occurring when the leading vehicle brakes, a probability that the leading vehicle will change its lane, a probability of a collision occurring when the following vehicle brakes, and a probability that the following vehicle will change its lane, based on the information sensed by at least the portion of the one or more sensors;
   control one or more of a braking operation of the leading vehicle and a lane change operation of the leading vehicle based on at least one of the generated probabilities; and
   transmit a control signal to the following vehicle via the communication circuit for controlling one or more of a braking operation of the following vehicle and a lane change operation of the following vehicle based on at least one of the generated probabilities.

2. The apparatus of claim 1, wherein the processor is further configured to:
   control the braking operation of the leading vehicle causing the leading vehicle to brake when it is determined that the collision will not occur when the leading vehicle brakes based on at least one of the generated probabilities.

3. The apparatus of claim 2, wherein the processor is further configured to:
   transmit the control signal to the following vehicle via the communication circuit for controlling the braking operation of the following vehicle causing the following vehicle to brake.

4. The apparatus of claim 3, wherein the processor is further configured to:
   output an indication of the braking operation of the leading vehicle via the display; and
   transmit a control signal to the following vehicle via the communication circuit for outputting an indication of the braking operation of the following vehicle causing the following vehicle to output the indication.

5. The apparatus of claim 1, wherein the processor is further configured to:
   control the lane change operation of the leading vehicle causing the leading vehicle to change its driving lane to a target lane adjacent to the driving lane when it is determined that the collision will occur when the leading vehicle brakes and that the leading vehicle is able to change its driving lane to the target lane based on at least one of the generated probabilities.

6. The apparatus of claim 5, wherein the processor is further configured to:
   when it is determined that the collision will occur when the leading vehicle brakes and that the leading vehicle is able to change its driving lane to the target lane, transmit the control signal to the following vehicle via the communication circuit for controlling a driving operation of the following vehicle causing the following vehicle to follow the leading vehicle and the lane change operation causing the following vehicle to change the driving lane to the target lane.

7. The apparatus of claim 6, wherein the processor is further configured to:
output an indication of the lane change operation of the leading vehicle and a direction of the lane change operation of the leading vehicle via the display; and
transmit a control signal to the following vehicle via the communication circuit for outputting an indication of the lane change operation of the following vehicle and a direction of the lane change operation of the following vehicle causing the following vehicle to output the indication.

8. The apparatus of claim 5, wherein the processor is further configured to:
transmit the control signal to the following vehicle via the communication circuit for controlling the braking operation of the following vehicle causing the following vehicle to brake when it is determined that the collision will not occur when the following vehicle brakes based on at least one of the generated probabilities.

9. The apparatus of claim 8, wherein the processor is further configured to:
output an indication of the lane change operation of the leading vehicle and a direction of the lane change operation of the leading vehicle via the display; and
transmit a control signal to the following vehicle via the communication circuit for outputting an indication of the braking operation of the following vehicle causing the following vehicle to output the indication.

10. The apparatus of claim 5, wherein the processor is further configured to:
transmit the control signal to the following vehicle via the communication circuit for controlling the lane change operation of the following vehicle causing the following vehicle to change its driving lane to a lane opposite the target lane when it is determined that the collision will occur when the following vehicle brakes and that the following vehicle is able to change the driving lane to the lane opposite the target lane based on at least one of the generated probabilities.

11. The apparatus of claim 10, wherein the processor is further configured to:
deactivate the platooning when the leading vehicle changes its driving lane to the target lane and when the following vehicle changes its driving lane to the lane opposite the target lane;
transfer a right to control the leading vehicle to a driver of the leading vehicle; and
transmit the control signal to the following vehicle via the communication circuit for controlling an operation of the following vehicle causing the following vehicle to transfer a right to control the following vehicle to a driver of the following vehicle.

12. The apparatus of claim 11, wherein the processor is further configured to:
output an indication of the lane change operation of the leading vehicle, a direction of the lane change operation of the leading vehicle, and the transfer of the right to control the leading vehicle via the display; and
transmit the control signal to the following vehicle via the communication circuit for outputting an indication of the lane change operation of the following vehicle, a direction of the lane change operation of the following vehicle, and the transfer of the right to control the following vehicle causing the following vehicle to output the indication.

13. The apparatus of claim 1, wherein the processor is further configured to:
deactivate the platooning when it is determined that the collision will occur when the leading vehicle brakes and that the leading vehicle is unable to change its driving lane to a lane adjacent to the driving lane based on at least one of the generated probabilities;
transfer a right to control the leading vehicle to a driver of the leading vehicle; and
transmit the control signal to the following vehicle via the communication circuit for controlling an operation of the following vehicle causing the following vehicle to transfer a right to control the following vehicle to a driver of the following vehicle.

14. The apparatus of claim 13, wherein the processor is further configured to:
output a warning of a collision involving the leading vehicle and an indication of the transfer of the right to control the leading vehicle via the display; and
transmit the control signal to the following vehicle via the communication circuit for outputting a warning of a collision of the following vehicle and an indication of the transfer of the right to control the following vehicle.

15. The apparatus of claim 1, wherein the processor is further configured to:
deactivate the platooning when it is determined that the collision will occur when the following vehicle brakes and that the following vehicle is unable to change its driving lane to a lane adjacent to the driving lane; and
transmit the control signal to the following vehicle via the communication circuit for controlling an operation of the following vehicle causing the following vehicle to transfer a right to control the following vehicle to a driver of the following vehicle.

16. The apparatus of claim 15, wherein the processor is further configured to:
transmit the control signal to the following vehicle via the communication circuit for outputting a warning of a collision of the following vehicle and an indication of the transfer of the right to control the following vehicle causing the following vehicle to output the indication.

17. A method for controlling platooning in a platooning group including a leading vehicle and one or more following vehicles, the method comprising:
sensing an object around the leading vehicle using one or more sensors;
predicting whether a collision with the object around the leading vehicle will occur using information sensed by at least a portion of the one or more sensors;
when the collision with the object is predicted to occur, generating a probability of a collision occurring when the leading vehicle brakes, a probability that the leading vehicle will change its lane, a probability of a collision occurring when the following vehicle brakes, and a probability that the following vehicle will change its lane, based on the information sensed by at least the portion of the one or more sensors;
controlling one or more of a braking operation of the leading vehicle and a lane change operation of the leading vehicle based on at least one of the generated probabilities; and
transmitting a control signal to the following vehicle via the communication circuit for controlling one or more of a braking operation of the following vehicle and a lane change operation of the following vehicle based on at least one of the generated probabilities.

18. The method of claim 17, wherein
the controlling comprises:
controlling the lane change operation of the leading vehicle causing the leading vehicle to change its driving lane to a target lane adjacent to the driving lane when it is determined that the collision will occur when the leading vehicle brakes and that the leading vehicle is able to change its driving lane to the target lane based on at least one of the generated probabilities, and
the transmitting comprises:
when it is determined that the collision will occur when the following vehicle brakes and that the following vehicle is able to change its driving lane to the target lane based on the generated probability, transmitting to the following vehicle a control signal for controlling a driving operation of the following vehicle causing the following vehicle to follow the leading vehicle and the lane change operation causing the following vehicle to change the driving lane to the target lane.

19. The method of claim 17, wherein
the controlling comprises:
controlling the lane change operation of the leading vehicle causing the leading vehicle to change its driving lane to a target lane adjacent to the driving lane when it is determined that the collision will occur when the leading vehicle brakes and that the leading vehicle is able to change its driving lane to the target lane based on at least one of the generated probabilities, and
where the transmitting comprises:
transmitting the control signal to the following vehicle for controlling the braking operation of the following vehicle causing the following vehicle to brake when it is determined that the collision will not occur when the following vehicle brakes based on at least one of the generated probabilities.

20. The method of claim 17, wherein
the controlling comprises:
controlling the lane change operation of the leading vehicle causing the leading vehicle to change its driving lane to a target lane adjacent to the driving lane when it is determined that the collision will occur when the leading vehicle brakes and that the leading vehicle is able to change its driving lane to the target lane based on at least one of the generated probabilities, and
wherein the transmitting comprises:
transmitting the control signal to the following vehicle for controlling the lane change operation of the following vehicle causing the following vehicle to change its driving lane to a lane opposite the target lane when it is determined that the collision will occur when the following vehicle brakes and that the following vehicle is able to change the driving lane to the lane opposite to the target lane based on at least one of the generated probabilities.

* * * * *